United States Patent [19]

Lindmayer

[11] Patent Number: 5,065,023

[45] Date of Patent: Nov. 12, 1991

[54] SOLID STATE HIGH RESOLUTION PHOTOGRAPHY AND IMAGING USING ELECTRON TRAPPING MATERIALS

[75] Inventor: Joseph Lindmayer, Potomac, Md.

[73] Assignee: Quantex Corporation, Rockville, Md.

[21] Appl. No.: 405,288

[22] Filed: Sep. 11, 1989

[51] Int. Cl.$^5$ .......................... G03C 5/16; G03C 7/00
[52] U.S. Cl. .............................. 250/330; 250/484.1; 250/486.1
[58] Field of Search ..................... 358/213.23; 250/484.1 B, 327.2 R, 330, 486.1

[56] References Cited

U.S. PATENT DOCUMENTS

| Re. 31,847 | 3/1985 | Luckey | 250/327.2 A |
|---|---|---|---|
| 2,074,226 | 3/1937 | Kunz et al. | 250/330 |
| 2,482,813 | 9/1949 | Urbach | 250/327.2 R |
| 2,482,815 | 9/1949 | Urbach | 250/327.2 R |
| 4,543,308 | 9/1985 | Schumann et al. | 250/327.2 R |
| 4,878,234 | 10/1989 | Pfeiffer et al. | 378/40 |
| 4,953,038 | 8/1990 | Schiebel et al. | 250/327.2 D |
| 4,983,834 | 1/1991 | Lindmayer et al. | 250/363.01 |

Primary Examiner—Carolyn E. Fields
Attorney, Agent, or Firm—Ostrolenk, Faber, Gerb & Soffen

[57] ABSTRACT

A photography and imaging system and method using electron trapping materials. An input image is formed on an imaging plate having a layer of the electron trapping material disposed thereon. Electrons of the electron trapping material are excited from a ground level to a trapping level in a density and spatial distribution corresponding to the input image. Upon the application of infrared light, the trapped electrons are released from the trapping level and fall to the ground level, emitting visible light in a pattern reproducing the original input image. The reproduced image is viewed, or captured and displayed. Color photography and imaging is obtained by layering a number of different electron trapping materials having different wavelength emissions. Infrared photography and imaging is obtained by uniformly charging the electron trapping material with visible light, and then exposing the charged material to an infrared image.

4 Claims, 3 Drawing Sheets

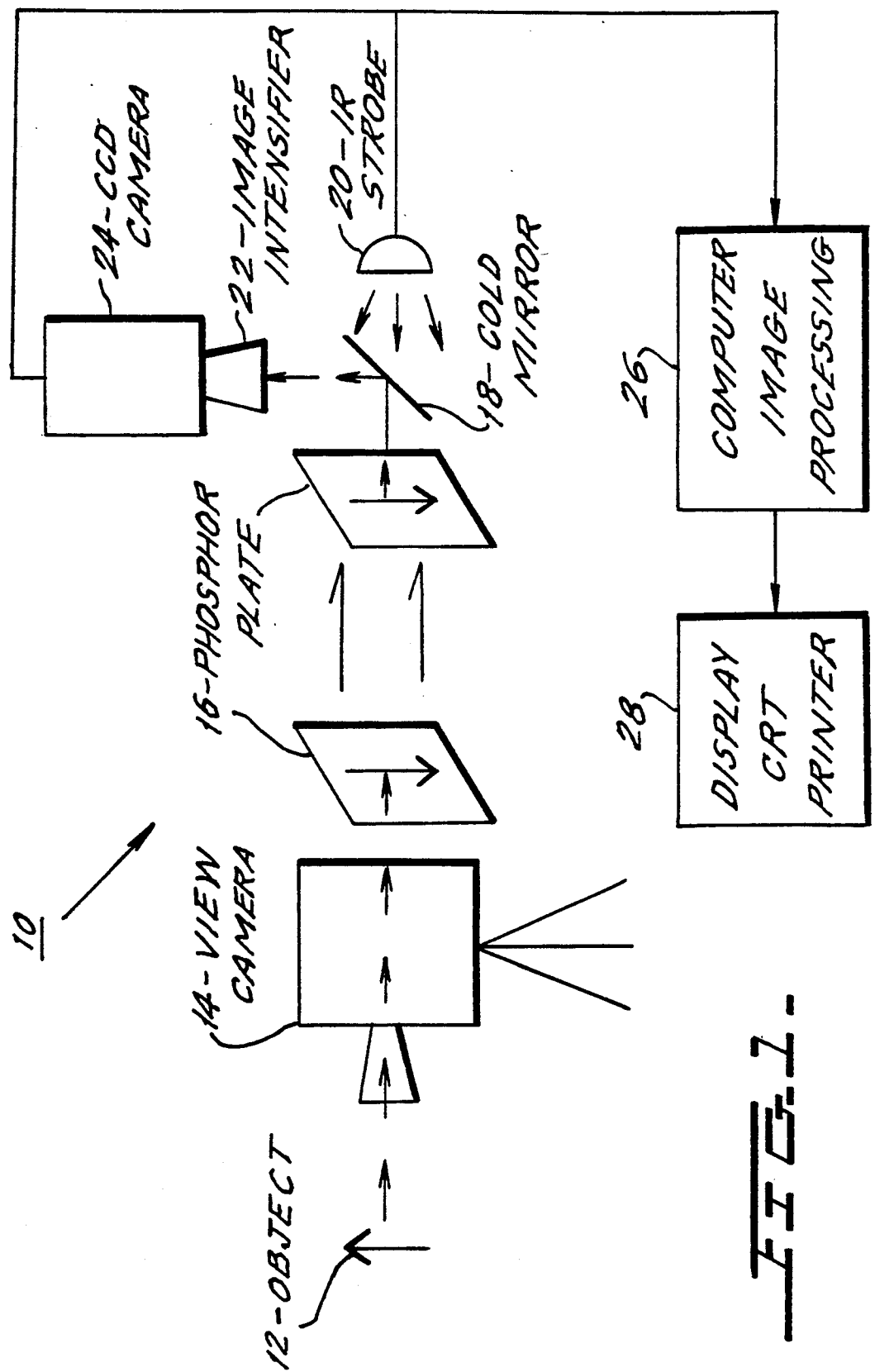

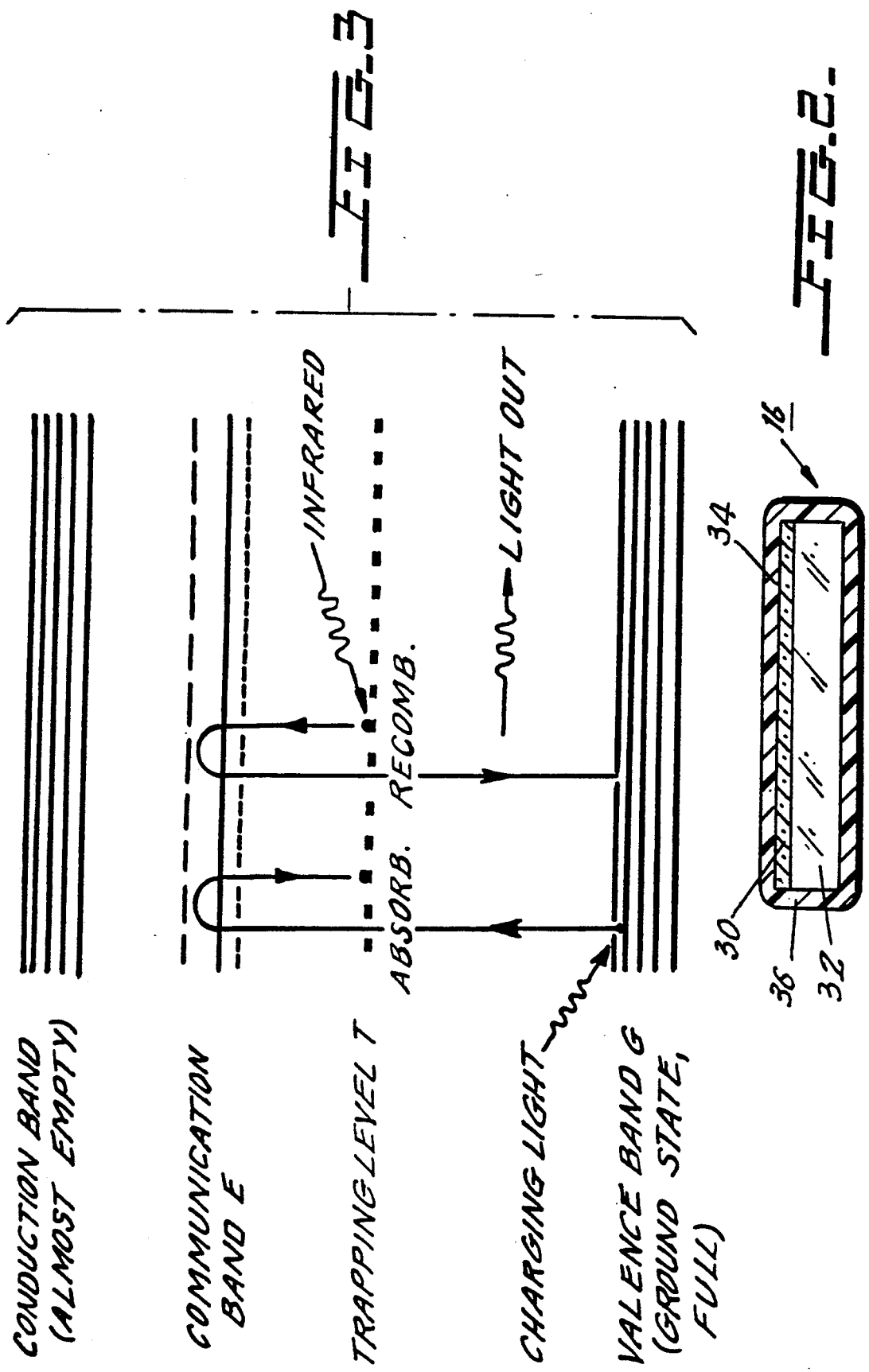

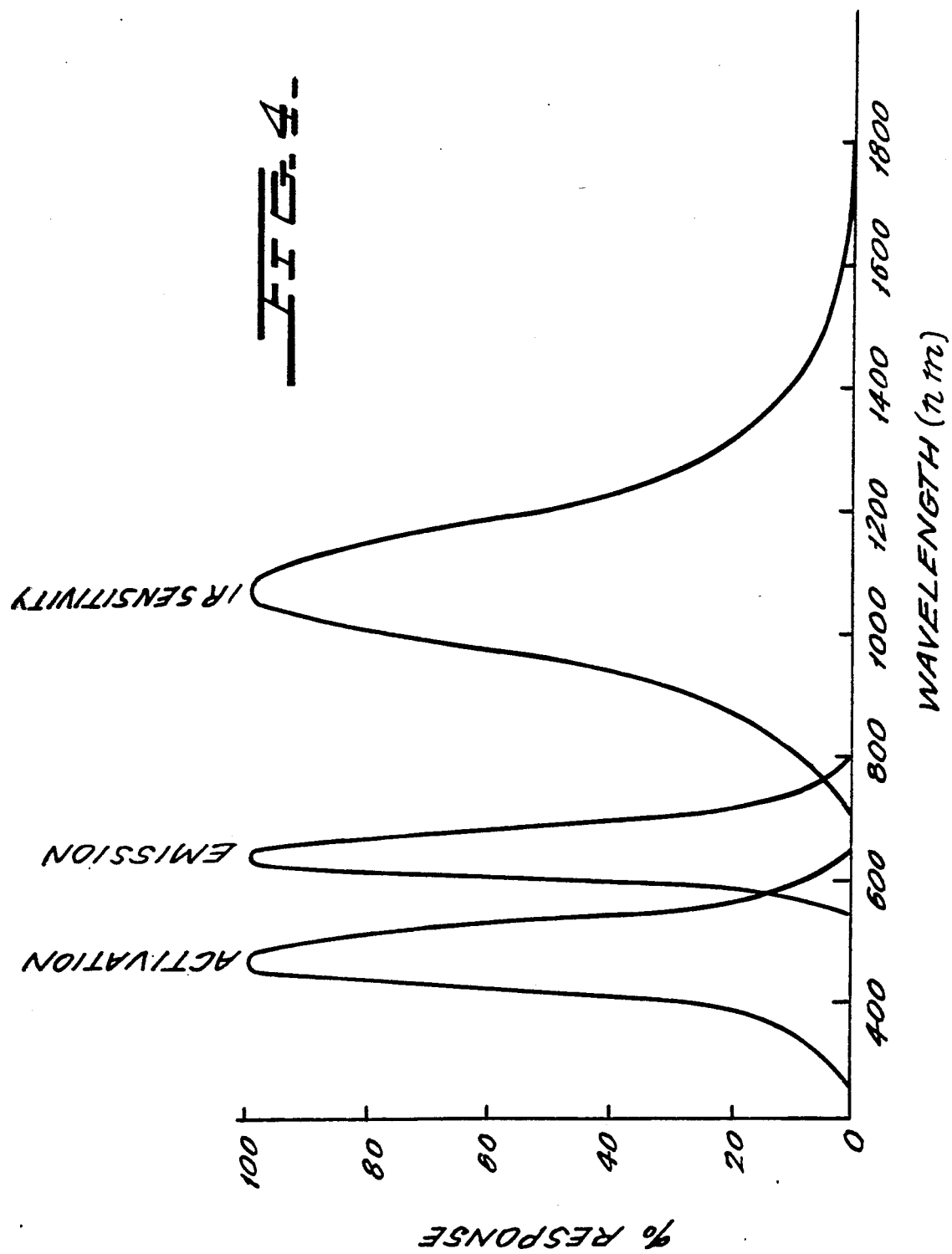

SOLID STATE HIGH RESOLUTION PHOTOGRAPHY AND IMAGING USING ELECTRON TRAPPING MATERIALS

BACKGROUND OF THE INVENTION

1. Field of the Invention

The present invention relates to solid state photography and imaging. More specifically, the invention is a system and method of high resolution photography and imaging using solid state electron trapping materials.

2. Description of the Related Art

Conventional photography involves exposure of a film coated with a light sensitive emulsion, usually cellulose film covered with an emulsion containing silver halide. Although well known and widely used, conventional photography has several significant drawbacks. For instance, conventional photographic film has a limited usable life span, must be developed with chemicals, and cannot be reused. Moreover, such film has a gray scale of only about two orders of magnitude, and its resolution is relatively coarse.

Accordingly, solid state imaging devices such as CCDs and CIDs have become increasingly prevalent. Unfortunately, such devices require a power source, which presents a problem in situations where images must be transmitted for long periods of time and external power is at a premium, such as in reconnaissance satellites.

SUMMARY OF THE INVENTION

Accordingly, the object of the present invention is to provide a new solid state photographic and imaging system without the above-noted deficiencies of conventional photography and which can operate without an external power supply.

This objective is achieved by a solid state photography and imaging system using a novel electron trapping material as the storage medium. When an object is imaged on this material, light from the image raises electrons in the material from a ground level to a higher energy trapping level. The density and spatial distribution of trapped electrons in the material reflects exactly the input image. Optical stimulation in the form of infrared radiation releases the trapped electrons, resulting in the emission of visible light in a manner that reproduces the original image of the object. The electron trapping material can be mixed with a binder and applied to a substrate or, for greater resolution, the electron trapping material can be vapor-deposited in a thin polycrystalline film on a substrate. The electron trapping material is an alkaline earth metal sulfide doped with rare earth impurities, preferably either strontium sulfide and/or calcium sulfide doped with samarium and either a europium or cerium compound.

BRIEF DESCRIPTION OF THE DRAWINGS

These and other features and advantages of the present invention will become apparent when the following text is read in conjunction with the accompanying drawings, in which:

FIG. 1 is a schematic layout of the preferred photography and imaging system of the invention;

FIG. 2 shows a cross-section of the imaging plate used in the present invention;

FIG. 3 is a schematic illustrating the principle of operation of the electron trapping material used in the present invention; and FIG. 4 shows activation, emission and sensitivity spectra for one type of electron trapping material which may be used in the invention.

DETAILED DESCRIPTION OF THE PREFERRED EMBODIMENTS

Referring first to FIG. 1, the solid state photography and imaging system of the present invention is shown generally by reference numeral 10. A view camera 14 focuses a photographic image of an object 12 onto an imaging plate 16, which comprises electron trapping material disposed on a substrate. Light from the photographic image incident on plate 16 raises electrons in the electron trapping material from a ground level to a higher trapping level, where they are stored at a density and spatial distribution corresponding to the input photographic image.

The stored image is retrieved from imaging plate 16 by irradiating the plate with infrared light, which releases electrons from their traps, resulting in the emission of visible light. Infrared light is preferably supplied by an infrared strobe 20 operating in the near-infrared range. The images can also be retrieved by scanning with an infrared beam of some resolution, including solid-state lasers. A cold mirror 18 (which passes infrared light but reflects visible light) is disposed adjacent plate 16 to ensure that stray visible light does not prematurely "expose" the solid state film by releasing trapped electrons. Imaging plate 16 is irradiated by the near-infrared light from strobe 20 for a period suitable to retrieve the image, preferably a fraction of a second. A low-level infrared illumination from strobe 20 discharges only a small portion of the trapped electrons. Images can be observed with infrared illumination several months or longer after the storage phosphor has been exposed to the image.

The retrieved image may simply be viewed in from imaging plate 16 by the naked eye (in the dark), or may be captured and subsequently displayed. The preferred way of capturing and subsequently displaying the image is with a CCD camera as illustrated in FIG. 1. An image intensifier 22 intensifies the released image and focuses it onto the input lens of a CCD camera 24. These cameras operate very well in the visible region and can be adjusted for integration times. Since all recorded images, including infrared images (discussed later), will show up in the form of visible light emission, the CCD camera is used as a form of electronic scanning while the film is illuminated by a infrared source from strobe 20. The CCD camera can also be used to focus into portions of the solid state image, which in general would have a much higher resolution and gray scale than the CCD camera. The digital image output from CCD camera 24 is processed by a computer 26 (e.g., a personal computer with frame-grabber circuitry) and is displayed on a cathode ray tube or a printer 28.

Another way of capturing and displaying the released image is by contact printing with conventional photographic film. This may be of special value for those situations where the large gray scale of the electron trapping material (about four orders of magnitude) is required and the information is selectively squeezed onto the relatively narrow gray scale of the ordinary photographic film. To transfer the image to conventional film, the imaging plate 16 is pressed against such a film and the electron trapping material is stimulated by an infrared strobe light in the manner discussed above. The film is then developed in a normal manner.

As shown in FIG. 2, imaging plate 16 is a film of the electron trapping material 30 disposed upon a substrate 32, which may be a rigid or flexible substance, such as paper, aluminum oxide, or plastic such as PVC. The substrate may be transparent or opaque, if opaque, a reflective surface or light color is preferred. The material 30 establishes a planar surface 34. An optional transparent coating 36 may encapsulate the material 30 and substrate 32.

The film of electron trapping material is ordinarily a layer of particulate material mixed with a binder, the layer having a thickness as small as about 5 microns and as large as about 100 microns. Alternatively, for improved resolution in the single or submicron range, a polycrystalline thin film of the electron trapping material may be deposited by chemical vapor deposition. Because no artificial "pixels" are involved in the imaging, the resolution is controlled by the particle sizes of the electron trapping materials or other internal reflections.

FIG. 3 shows the principles of operation of the electron trapping material used in the present invention. The basic crystalline photoluminescent material used has a valence band G full of electrons at a ground state. The material is subjected to visible light which functions to energize certain electrons in the valence band G. An electron shown on the left is originally in a valence band G and is subjected to visible charging light. The electron absorbs a photon raising its energy level to a communication band E where communication takes place with other energized electrons resulting in transitions. Upon removal of the energizing light, the electron may drop back to a trapping level T or back to the valence band G depending upon the composition of the material and available trapping sites. The electron, if in the trapping level T, will remain isolated from other electrons and trapped until sufficient additional energy is provided to the electron to raise its energy back up to the communication band E.

As shown on the right side of FIG. 3, an electron may be stimulated by infrared electromagnetic energy to move it back to the communication band E where it may interact with other electrons and undergo recombination causing it to move back to the valence band G and output a photon of visible light in the process.

The electron trapping material used in the present invention works upon the principle illustrated by FIG. 3 whereby light may be "stored" by the phenomenon of electron trapping and the light may be freed by application of infrared radiation to push the electron up above the trap and allow it to return to the valence band. The number of trapping sites, the depth of the traps and the probability of transitions occurring in the communication band are all dependent upon the composition of the photoluminescent material used.

The electron trapping material is formed of an alkaline earth metal sulfide base doped with rare earth impurities. A number of different electron trapping materials have been developed by the present inventor. For example, U.S. Pat. No. 4,839,092 discloses a material formed of a strontium sulfide base doped with samarium and europium (SrS:Sm,Eu). This material outputs orange light centered at 620 nm. Similarly, U.S. Pat. No. 4,842,960 discloses a material formed of a mixed strontium sulfide/calcium sulfide base doped with samarium and europium (SrS/CaS:Sm,Eu). This material also emits orange light, but has a very high efficiency and a brighter output than the material without calcium sulfide. As shown in FIG. 4, the activation wavelength of this preferred SrS/CaS:Sm,Eu material is about 440 nm, its emission wavelength is orange (about 630 nm) and its stimulation wavelength is near-infrared. U.S. Pat. No. 4,879,186 discloses a material formed of a calcium sulfide base doped with samarium and europium (CaS:Sm,Eu), which outputs a reddish-orange light centered at 660 nm.

For shorter wavelength emission, U.S. Pat. No. 4,822,520 discloses a material formed of a strontium sulfide base doped with samarium and cerium (SrS:Sm,Ce). This material emits blue-green light centered at 495 nm. U.S. Pat. No. 4,812,660 discloses a material formed of a calcium sulfide base doped with samarium and cerium (CaS:Sm,Ce), which outputs a yellow-green light centered at 510 nm.

Each of the above electron trapping materials have electron traps with depths of about 1.2 electron volts below the communication band. Further details of the materials and the processes for making the materials are set forth in the disclosures of each of the above-referenced U.S. patents and application, which are herein incorporated by reference.

The wide range of materials available creates a number of different imaging possibilities. For example, choosing the SrS:Sm,Eu material, whose emission wavelength is 620 nm (orange), means that the "film" can be exposed with wavelengths shorter than 620 nm. When a photograph is taken, for instance in daylight, an image is imprinted by the available green, blue, violet and ultraviolet light. The image is reclaimed by illuminating the film with a broad infrared source such as infrared strobe 20; the image reappears in the form of orange emission. Eventually the emission decays, but the image can be captured, as described above, by contact printing to conventional films or by electronic means by using an integrating CCD camera. At the end of this cycle, the film is fully reusable.

If another material, as described above, is chosen, such as SrS:Sm,Ce, the emission wavelength is 495 nm (blue-green), so only blue, violet and ultraviolet will form images. As before, the image can be retrieved by illuminating the "film" with a broad infrared source.

The CaS:Sm,Eu material has its emission in the reddish-orange. Again, images can be formed from orange to ultraviolet and the image can be reclaimed.

Geometrical arrangements allow for color photography. For example, if the materials are simply mixed in powder form, ranges of available light will expose different phosphors. Upon infrared illumination, all particles will emit each composition at different wavelengths. For example, SrS:Sm,Eu and SrS:Sm,Ce mixed together will show orange and blue emissions simultaneously.

A more orderly approach is to deposit layers of different electron trapping phosphors on top of each other. Since the phosphor recharges and absorbs at wavelengths shorter than the emission wavelength, the order must be such that the phosphor with the shortest emission wavelength is on top. For example, a sandwich of SrS:Sm,Ce; SrS:Sm,Eu; and CaS:Sm,Eu phosphors will cover a broad range of the visible spectrum; the SrS:Sm,Ce layer will absorb blue and violet, the middle SrS:Sm,Eu layer will take the green which passes through the first layer and the bottom CaS:Sm,Eu layer will be excited by the red-orange which passes through the first two layers. Color separation is further improved by employing optical coatings between the phosphor layers.

The electron trapping material may also be used for infrared photography by first exposing the electron trapping material to visible light so that all traps are filled to a uniform population density. An incident infrared image depletes the traps proportionately, so that a "negative" image is created. This image may be viewed, or captured and displayed as discussed above. The images can be fixed from deep red light, through the near infrared region, and to longer wavelengths with cooling. The calcium base materials have extended IR sensitivity, and are best suited for infrared imaging.

Although the present invention has been described in connection with preferred embodiments thereof, many variations and modifications will now become apparent to those skilled in the art. It is preferred, therefore, that the present invention be limited not by the specific disclosure herein, but only by the appended claims.

What is claimed is:

1. A system for solid state photography and imaging, comprising:
   means for forming an image of an object; and
   an imaging plate for releasably storing said image, said imaging plate comprising an electron trapping material disposed upon a substrate, said electron trapping material having a plurality of energy levels and having the capability to store said image in the form of energy when electrons in said material are raised from a ground energy level to a trapping energy level as a result of the impingement of electromagnetic radiation of a first wavelength from said image upon said material, said electron trapping material also having the capability of releasing said stored image in the form of electromagnetic radiation of a second wavelength when triggered by application of electromagnetic radiation of a third wavelength thereon, said electromagnetic radiation of said third wavelength releasing electrons from said trapping energy level, said released electrons falling down to said ground energy level, said released electrons falling down to said ground energy level and emitting said electromagnetic radiation of said second wavelength in a pattern corresponding to said image;
   wherein said electron trapping material comprises a plurality of layers, each of which absorbs a different spectrum of light and emits light centered about a different wavelength on the top, such that said image is releasably stored in color.

2. A method of infrared photography and imaging, comprising the steps of:
   (a) charging an electron trapping material broadly and uniformly with visible light, said visible light raising electrons in said material from a ground level to a trapping level,
   (b) exposing said charged electron trapping material to an infrared image, the light from said infrared image releasing electrons from said trapping level in a density and spatial distribution corresponding to said infrared image, the remaining trapped electrons being arranged in a density and spatial distribution corresponding to a negative of said infrared image, whereby the negative of said infrared image is stored in said electron trapping material in the form of raised energy electrons in traps,
   (c) releasing said raised energy electrons from their traps by stimulating said electron trapping material broadly and uniformly with infrared light, resulting in the emission of visible light in a pattern corresponding to the negative of said infrared image.

3. The method of claim 2, further comprising the step of capturing and displaying the visible light negative of said infrared image released from said electron trapping material.

4. The method of claim 3, wherein said step of capturing and displaying the visible light negative of said infrared image is performed by directing said emitted visible light into a CCD camera equipped with an image intensifier, processing the output of said CCD camera, and displaying the resultant processed image.

* * * * *